(12) United States Patent
Raynor

(10) Patent No.: US 10,046,402 B2
(45) Date of Patent: Aug. 14, 2018

(54) ROTARY CUTTING TOOL

(71) Applicant: Exactaform Cutting Tools Limited, Coventry (GB)

(72) Inventor: Peter Raynor, Coventry (GB)

(73) Assignee: EXACTAFORM CUTTING TOOLS LIMITED (GB)

( * ) Notice: Subject to any disclaimer, the term of this patent is extended or adjusted under 35 U.S.C. 154(b) by 161 days.

(21) Appl. No.: 14/396,520

(22) PCT Filed: Apr. 26, 2013

(86) PCT No.: PCT/GB2013/051067
§ 371 (c)(1),
(2) Date: Oct. 23, 2014

(87) PCT Pub. No.: WO2013/160692
PCT Pub. Date: Oct. 31, 2013

(65) Prior Publication Data
US 2015/0093204 A1 Apr. 2, 2015

(30) Foreign Application Priority Data
Apr. 26, 2012 (GB) .................................. 1207447.2

(51) Int. Cl.
*B23C 5/10* (2006.01)
*B23C 5/18* (2006.01)

(52) U.S. Cl.
CPC .............. *B23C 5/1081* (2013.01); *B23C 5/10* (2013.01); *B23C 5/18* (2013.01); *B23C 2210/03* (2013.01);
(Continued)

(58) Field of Classification Search
CPC ..... B23C 5/1081; B23C 5/18; B23C 2210/03; B23C 2210/0492; B23C 2210/326; B23C 2240/08; Y10T 408/78; Y10T 407/1904
See application file for complete search history.

(56) References Cited

U.S. PATENT DOCUMENTS 1,887,372 A * 11/1932 Emmons ................. B23P 15/28
                                                        175/435
2,537,818 A *  1/1951 Evans .................... B23D 77/02
                                                        408/144
(Continued)

FOREIGN PATENT DOCUMENTS

CN          201164914      12/2008
DE          102006008887    8/2007
(Continued)

OTHER PUBLICATIONS

United Kingdom Search Report, Application No. GB1207447.2, Exactaform Cutting Tools Limited, dated Oct. 5, 2012.
(Continued)

*Primary Examiner* — Daniel Howell
*Assistant Examiner* — Ryan Rufo
(74) *Attorney, Agent, or Firm* — McDonald Hopkins LLC

(57) ABSTRACT

A rotary cutting tool (10) comprises a shank (12) formed of a first material of a first hardness. The shank (12) has a first end (12*a*), and a plurality of elements (14) are provided at the first end (12*a*) of the shank (12). The elements (14) are formed of a second material of a second hardness greater than that of the first hardness. The elements (14) provide a platform to be able to create a plurality of cutting edges or teeth (18, 20*a*). A method of forming such a rotary cutting tool is also provided.

24 Claims, 7 Drawing Sheets

(52) U.S. Cl.
CPC .................... *B23C 2210/0492* (2013.01);
*B23C 2210/326* (2013.01); *B23C 2226/315*
(2013.01); *B23C 2240/08* (2013.01); *Y10T
407/1904* (2015.01)

(56) References Cited

U.S. PATENT DOCUMENTS

| | | | | |
|---|---|---|---|---|
| 2,780,858 | A * | 2/1957 | Robinson | B23C 5/18 |
| | | | | 407/118 |
| 5,031,484 | A | 7/1991 | Packer | |
| 5,099,933 | A * | 3/1992 | Schimke | B27G 15/00 |
| | | | | 144/106 |
| 5,115,697 | A * | 5/1992 | Rodriguez | B23C 5/1081 |
| | | | | 407/118 |
| 5,193,944 | A | 3/1993 | Nishimura | |
| 5,272,940 | A * | 12/1993 | Diskin | B23C 5/1081 |
| | | | | 407/118 |
| 5,848,861 | A * | 12/1998 | Hansen | B23B 51/04 |
| | | | | 408/143 |
| 6,164,876 | A * | 12/2000 | Cordovano | B23C 5/10 |
| | | | | 407/59 |
| 8,176,825 | B1 * | 5/2012 | Isaacson | B23C 5/1081 |
| | | | | 175/435 |
| 2006/0063477 | A1 | 3/2006 | Necca et al. | |
| 2007/0274790 | A1 * | 11/2007 | Maurer | B23C 5/1081 |
| | | | | 407/34 |
| 2007/0280792 | A1 * | 12/2007 | Kochan | B23C 5/10 |
| | | | | 407/53 |
| 2009/0136308 | A1 | 5/2009 | Newitt et al. | |
| 2009/0208301 | A1 * | 8/2009 | Kuroda | B22F 7/062 |
| | | | | 408/144 |
| 2009/0245952 | A1 * | 10/2009 | Banduch | B23C 5/1081 |
| | | | | 407/54 |
| 2010/0303564 | A1 | 12/2010 | Xiao | |
| 2011/0280673 | A1 | 11/2011 | Degany | |
| 2014/0023445 | A1 * | 1/2014 | Allen | B23B 51/009 |
| | | | | 408/144 |

FOREIGN PATENT DOCUMENTS

| | | | | |
|---|---|---|---|---|
| FR | | 2929869 | 10/2009 | |
| FR | | 2946551 | 12/2010 | |
| JP | | 03-073209 A | * 3/1991 | ............... B23C 5/18 |
| JP | | 2006 281371 | 10/2006 | |
| JP | | 2006/281371 A | 10/2006 | |
| WO | WO 2010142747 A1 | * | 12/2010 | ............... B23C 5/10 |

OTHER PUBLICATIONS

International Search Report, PCT Application PCT/GB2013/051067, Exactaform Cutting Tools Limited, dated Aug. 5, 2013.
United Kingdom Examination Report, Application No. GB1420710.4, dated Apr. 25, 2016.

* cited by examiner

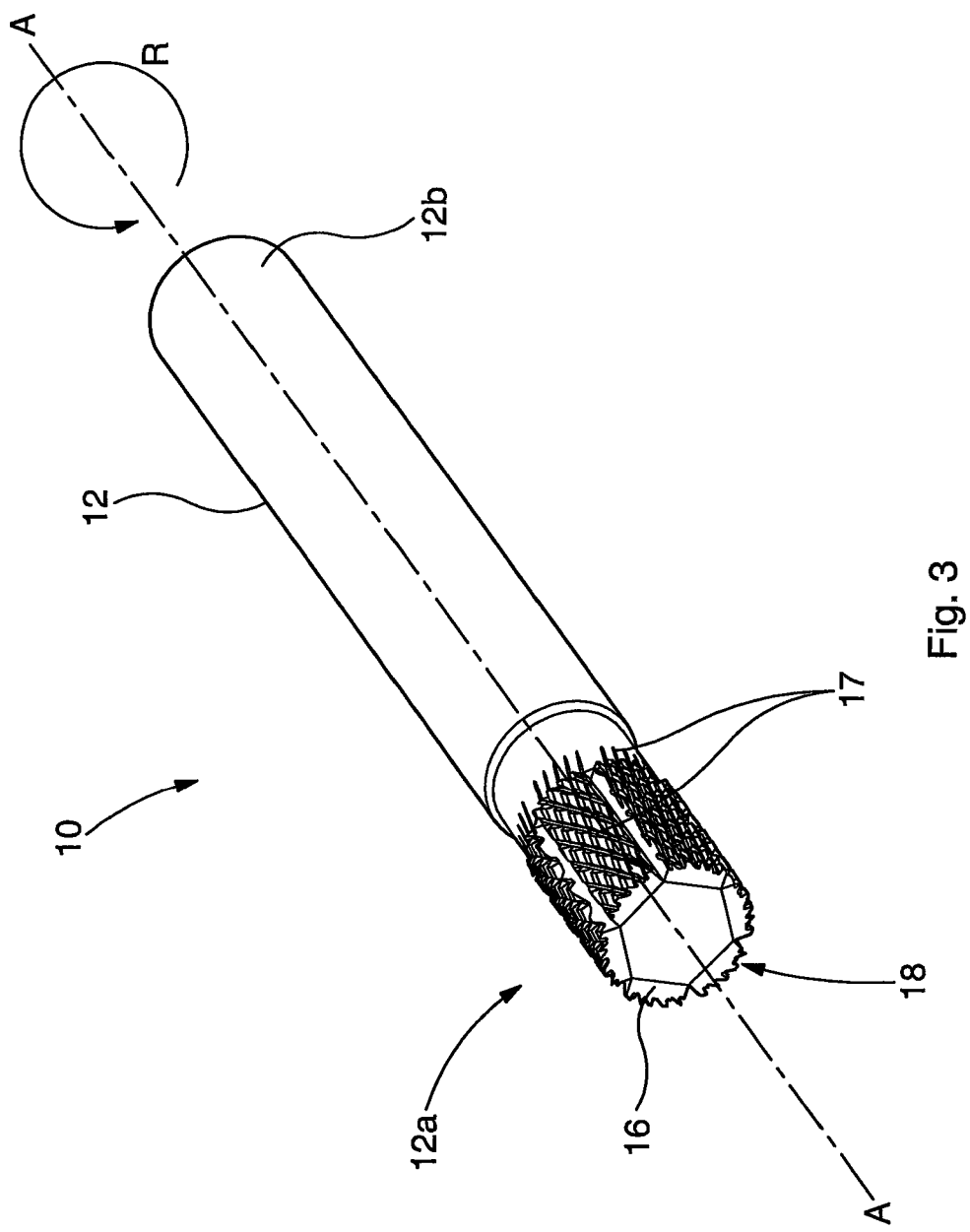

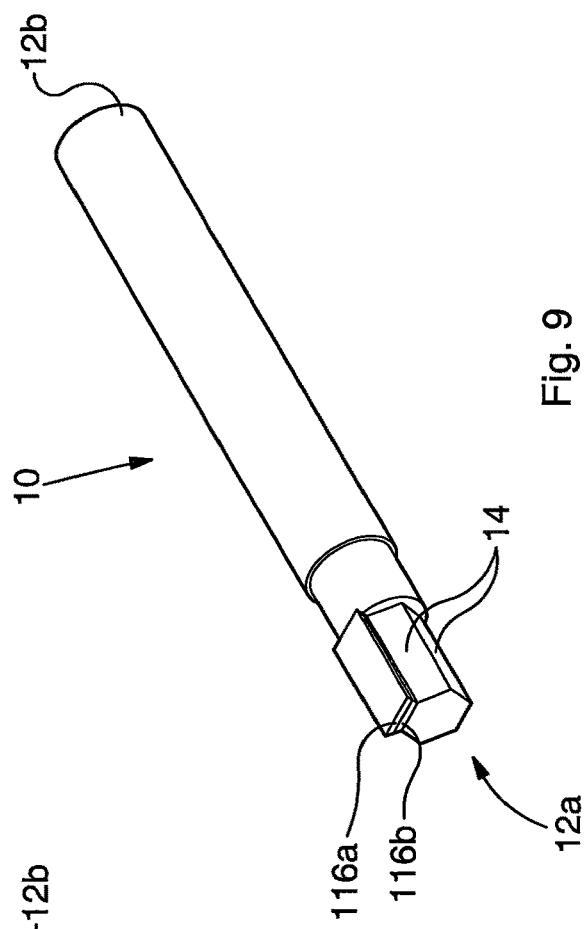
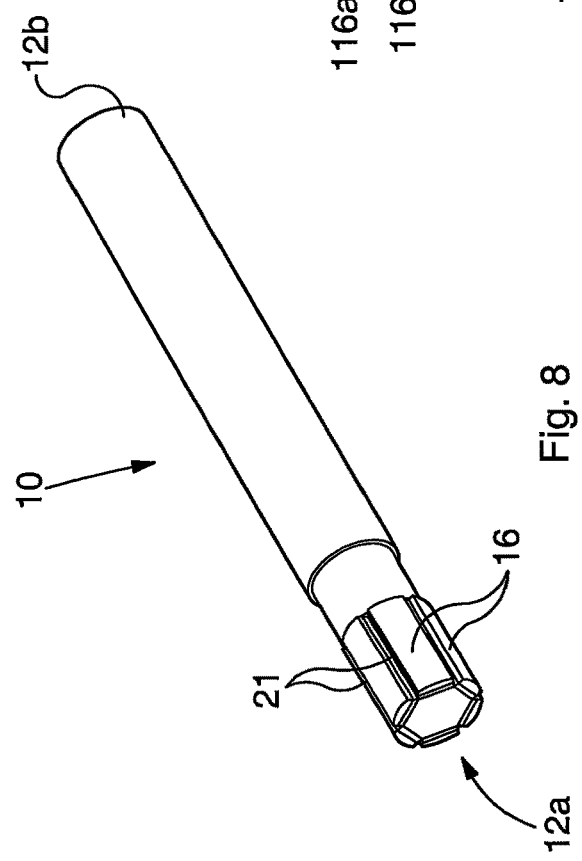

ROTARY CUTTING TOOL

The present invention relates to a rotary cutting tool, a blank therefor and a method of forming the same.

Fibre Reinforced Composites (FRC) are used in many applications (e.g. panels to structural reinforcements) due to their superior strength to weight ratio and high resistance to fatigue and flexibility. Developments in the past twenty years have improved technologies both in the manufacture of such materials as well as machining techniques. This has resulted in a range of applications e.g. throughout the defense, automotive and civil engineering industries, as well as consumer markets. The aerospace industry is the market leader in the use of these modern materials and is currently responsible for the majority of the global consumption. Due to the nature of applications within such industries, there is an extremely great emphasis on being able to machine to a high dimensional precision and achieve a super fine surface finish.

One such application is military combat aircraft, with composites used for a range of applications, from large panels and structural reinforcements to small internal components. Composites are extremely difficult to machine due to the layered composition and the heterogeneity that is a common characteristic within most of these modern materials. Therefore, the costs associated with the machining processes become an important factor to consider when undertaking projects involving composites. The development of machining technologies and tooling is critical to the success of composites in the future as the expenses that are associated with scrapping large components, such as panels, can become astronomical.

A common problem encountered when machining FRC is delamination and burring. Delamination is a failure of the composite material whereby, as a result of machining, the layers of a composite material are caused to separate. Delamination is perhaps the most critical problem encountered when machining fibre composites as it directly removes the advantages known to be associated with the layered fibres (weight savings, strength etc.). Burring is a deformation of a material whereby irregularities or rough surfaces or edges are created along cut edges/drilled holes etc. due to the machining process. Delamination and burring reduce the final part quality and can adversely affect dimensional accuracy.

A further problematic area associated with machining composites is heat generation. Excess heat can directly impact the matrix of the composite and cause material property degradation. The maintaining of a sharp cutting edge advantageously reduces any heat build-up and retains the structural integrity of the composite material.

Various cutting tools are known and available, some of which are discussed below.

Diamond grit tools (i.e. cutting tools whereby diamond grains are bonded to the functional parts of the tool) are used for high stock removal in composite machining, and are capable of high machining speeds and feeds. However, the achievable finish from these tools is very poor and only very wide tolerances can be held. Although these tools can be cost effective, a second tool is also required to deburr the part being machined and create a suitable surface finish, as well as a required tolerance.

Carbide burr tools are used in similar applications as diamond grit tools. These are easy to grind into the desired profile and so this offers flexibility for manufacture of a variety of cutting applications. However FRCs are extremely abrasive and therefore the life of carbide tooling is very low. As a result, the cost of machining increases due to the need for large quantities of tooling. This also introduces additional tool change over time.

Straight multi-flute end mills e.g. formed of carbide, with or without solid polycrystalline diamond (PCD) tips, or inserts, are commonly used for machining composites as the load per tooth can be distributed, reducing the effects of de-lamination and slowing heating rates to provide a clean surface finish. However, separate cutting and finishing passes are required to reduce the load per tooth and achieve a superior surface finish. This typically involves using separate cutting and finishing/deburring tools, which complicates and extends the machining process or, if the same tool is used in multiple passes, the tool life will be dramatically reduced.

Spiral end mills, or tooling with helical geometry, are preferred for composite edge machinery as the helix provides a constant geometry all the way around the diameter, causing constant shear to form rather than uneven cutting forces. A helical flute also helps to reduce vibration during the cutting operation, which is advantageous when trying to reduce unwanted movement in the part. Furthermore, swarf evacuation is improved with spiral flute geometry, removing unwanted chips away from the cutting edges. There are also drawbacks to using helical geometry, including the expense and complexity for such tooling. As a result, cutting tools that can traditionally benefit from such geometry are normally made from softer, easier to manipulate materials, such as is discussed below.

Due to low wear resistance of mill tool materials such as carbide or high speed steel, a diamond coating applied by chemical vapour deposition (CVD) has often been used CVD advantageously offers flexibility with tool geometry and improved tool life and diamond-coated drills can offer 10 times improved tool life over uncoated carbide.

Diamond coated carbide cutting tools have been tested and proved very successful for certain applications, mostly low volume work where the tool can be most justified, despite the longevity of such tools being lower than solid PCD tipped tooling. The coating process is very time consuming and expensive. CVD tooling also lacks the availability for rework.

It is also known to use tools that incorporate polycrystalline diamond (PCD), renowned for being the superior tooling solution with respect to tool longevity in addition to good thermal and chemical properties. However such tooling can become expensive due to cost of materials and difficulties with manufacturing.

To discuss PCD tools further it must be understood that a PCD tool can be formed by a number of different manufacturing methods; solid PCD fillets attached to a body of different material, solid PCD cylinders sintered in situ or veined PCD tooling.

A veined PCD tool is manufactured by sintering powdered PCD into grooves formed onto a tool body. The grooves are formed prior to sintering and will incorporate the design features of the final tool, for example the helix angle or the number of teeth. Whilst this advantageously protects the tool from both abrasive materials and heat resistance and enables complex geometries to be formed, such as high helix angles, there is a lack of flexibility once the blank has been formed (e.g. the helix angle is not a variable, and nor is the cutting length). Therefore, the blanks must be tailored to each application—a process that is already extremely expensive and complex. Furthermore, the powdered diamond is limited by the forces that can be endured before cracking appears causing tool failure. This method does not permit as many tool refurbishments (refreshment) as solid PCD tooling.

Manufacturing an entire tool from solid PCD cylinder is not a viable option in these kinds of tools since it is both more expensive and harder to manufacture. It cannot be machined as easily or flexibly as carbide tooling, or coated carbide tooling, but it advantageously has a longer lifetime due to its inherent hardness. In the past, machining PCD has proved to be a slow process and has only been performed in order to provide cutting edge characteristics required in certain applications.

Arguably the most favourable PCD tool with respect to manufacturing advantages and overall cost is a tool that uses solid PCD inserts. This however limits the geometry to tools with straight edges.

The present invention has been developed with the foregoing in mind.

According to a first aspect of the present invention, there is provided a rotary cutting tool as defined in claim 1. According to a second aspect of the present invention, there is provided a blank for forming into a rotary cutting tool, as claimed in claim 15. A third aspect of the invention relates to a method of manufacturing or forming a rotary cutting tool as defined in claim 16. A fourth aspect of the invention relates to a method of forming a blank according to claim 30.

The invention uses solid PCD inserts to form a tool than can be advantageously manufactured into a cutting tool comprising complex geometries, otherwise unachievable with solid PCD.

A cutting tool derived from the invention provides a single, combination cutting tool for efficiently and effectively cutting material that can be difficult to machine (e.g. FRC), whilst simultaneously providing a fine finish to the material that conforms to predetermined or desired manufacturing tolerances. The invention also provides for high stock removal (i.e. the ability to cut or remove substantial amounts of material).

A cutting tool derived from the present invention, as described in the enclosed embodiments, advantageously enables material (e.g. FRC sheets) to be cut with high precision in one pass. Prior methods, such as those discussed above, typically require a first step in which a cutting tool was used to coarsely cut through the material, a second step whereby a rough cut/deburring was carried out, followed by a third step—a fine or finishing cut/debarring operation. As discussed above, such methods either require separate tools—a cutting tool and a deburring tool, and/or the need to make more than one pass in order to obtain the required finish which shortens the lifetime of the tooling. The tool of the invention will benefit from a long life and durability in comparison to other known tools. Reducing the amount of tooling consequently reduces production time and increases productivity, thereby reducing the cost per unit of machining. Furthermore, the present invention provides for a good quality surface finish—i.e. the tool will not cause any property degradation, burrs or delamination. This is all made viable by the combination of traditional complex geometry and advantageous chemical and thermal properties of solid PCD.

In an embodiment of said cutting tool, the first material is carbide and the second material is polycrystalline diamond (PCD).

In an embodiment, the shank is generally cylindrical. Alternatively, the shank could have a different cross-sectional shape, e.g. substantially square or hexagonal. The plurality of elements are each attached to a surface formed at the first end of the shank. Preferably, the surfaces are flat and extend longitudinally in line with the longitudinal axis of the shank.

In a preferred embodiment, the cutting tool comprises a plurality of teeth that provide the cutting edges. The plurality of elements may advantageously provide cutting edges or teeth that surround or substantially surround the first end of the shank. Embodiments of the invention can effectively provide a surface of PCD around a carbide body, advantageously providing the benefits associated with using solid PCD e.g. increased hardness, precision cutting ability, etc. whilst still providing a blank that is flexible and convenient to work with. Embodiments of the invention thus provide a new kind of tooling that combines solid PCD with burr geometry and benefits from the advantages associated therewith.

The elements may be configured to comprise one or more sets of flutes and the plurality of cutting edges are provided by the one or more sets of flutes. Preferably, the elements are configured to have a first set of flutes at a first helical angle with respect to the longitudinal axis of the shank and a second set of flutes at a second helical angle with respect to the longitudinal axis of the shank. The plurality of cutting edges are preferably formed due to the intersection of said first and second sets of flutes.

The first set of flutes may have a positive helix with respect to the longitudinal axis of the shank and the second set of flutes may have a negative helix with respect to the longitudinal axis of the shank. The provision of teeth provided along a positive helix and a negative helix advantageously distributes the force endured by the tool during cutting, prolonging the life of the cutting tool.

The first set of flutes may be provided at a first positive helical angle the said second set of flutes may be provided at a second negative helical angle not equal to the first helical angle with respect to the longitudinal axis of the shank. Alternatively, the first helical angle may equal the second helical angle with respect to the longitudinal axis of the shank.

In some of the elements, or each element, the second material may be mounted on a substrate of a third material during manufacture, which, in turn is mounted on the shank. The third material may be the same as, or different from, the first material. The attachment surface of the second material is preferably flat, whether it is attached directly to the shank, and a corresponding flat surface thereon, or to a corresponding surface of the third material. Where the elements are formed of the second material attached to the third material, the surface attaching the first material of the shank to the third material of the element need not be flat, but the surfaces on the first and third materials, i.e. on the shank and each element, are complementary in shape. Where these complementary surfaces are not flat, they may be curved, and the surface of the element may match a diameter of the shank, for example, or may extend substantially tangentially to a notional diameter of the shank. The attachment surface of the second material preferably extends substantially parallel to a tangent from a notional diameter of the shank. In other words, the flat attachment surfaces of the second material are preferably mounted around the end of the shank and extend partially or completely around the diameter of the shank to form a generally continuous region around the shank, to which cutting geometry can be added. These second surfaces may be attached directly to the shank, or may be mounted on a substrate of third material, which is then mounted on the shank. This allows a substantially flat disc of second material to be produced, which is then mounted on the shank. The flat disc of second material may be much easier and or cheaper to produce than other methods of forming the material, while allowing the material to be mounted onto the shank, either directly onto a substantially flat region thereon, or via a substrate with a flat surface attached to the second material, and an opposing surface which is complementary in shape to a receiving surface on the shank.

It will be appreciated that preferable features of the first aspect may also be applied to the second aspect. Similarly, preferable features of the third aspect may be applied to the fourth aspect of the invention.

Embodiments of the invention will now be described with reference to the accompanying drawings in which:

FIGS. 1, 2 and 3 show isometric views of a rotary cutting tool at various stages during formation thereof;

Figure 2:
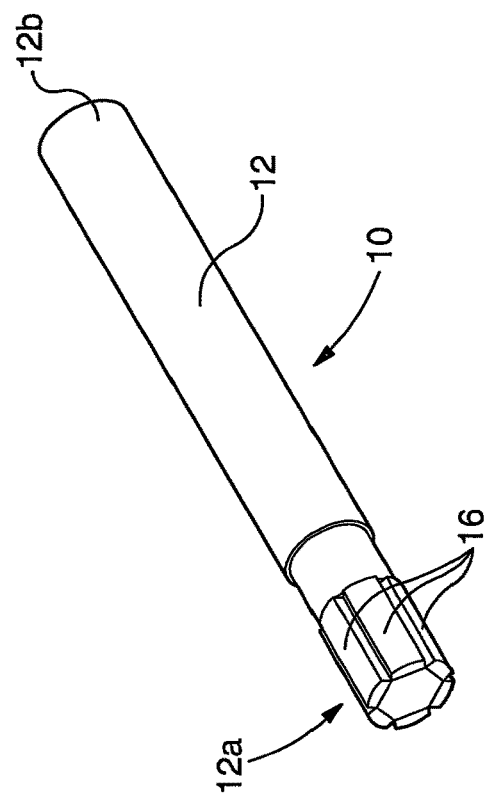
Figure 1:
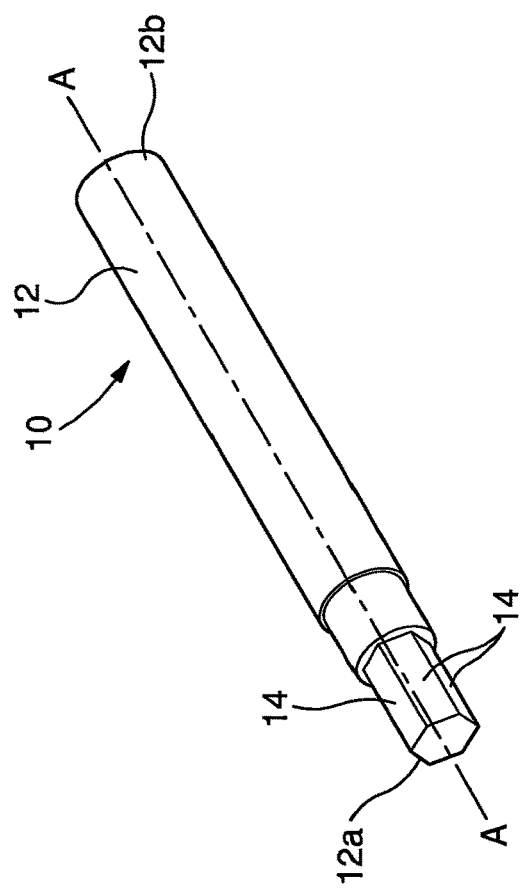
Figure 7:
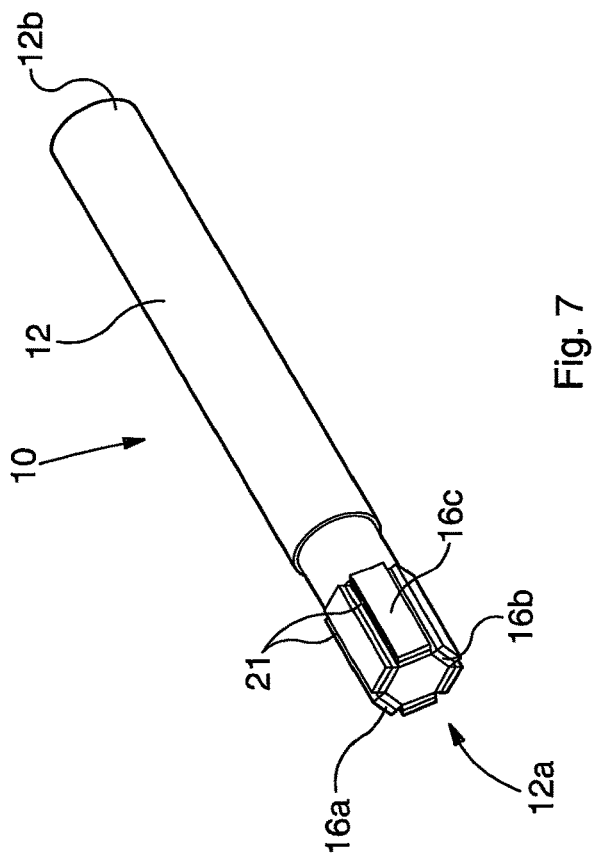
Figure 6:
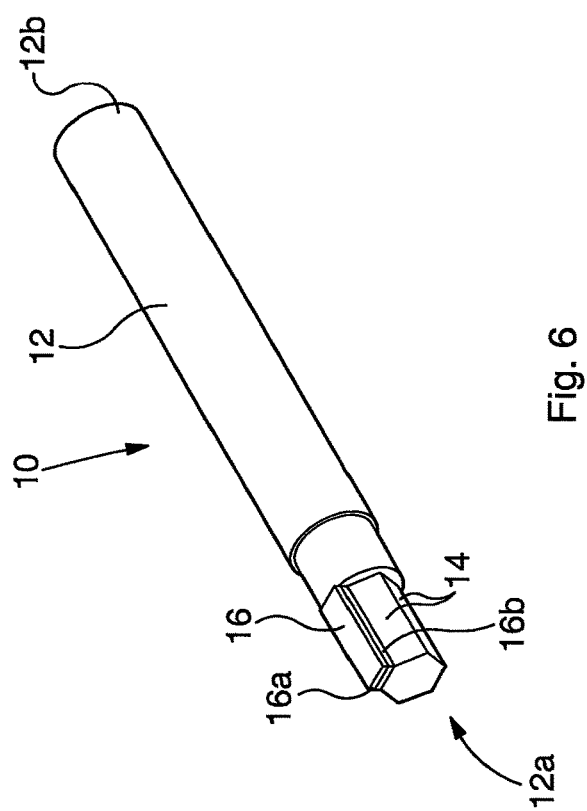
Figure 10:
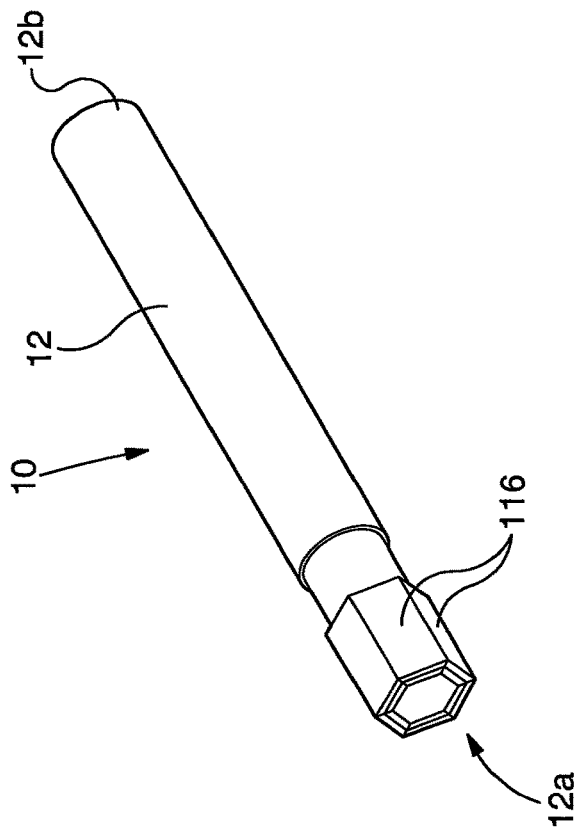
Figure 11:
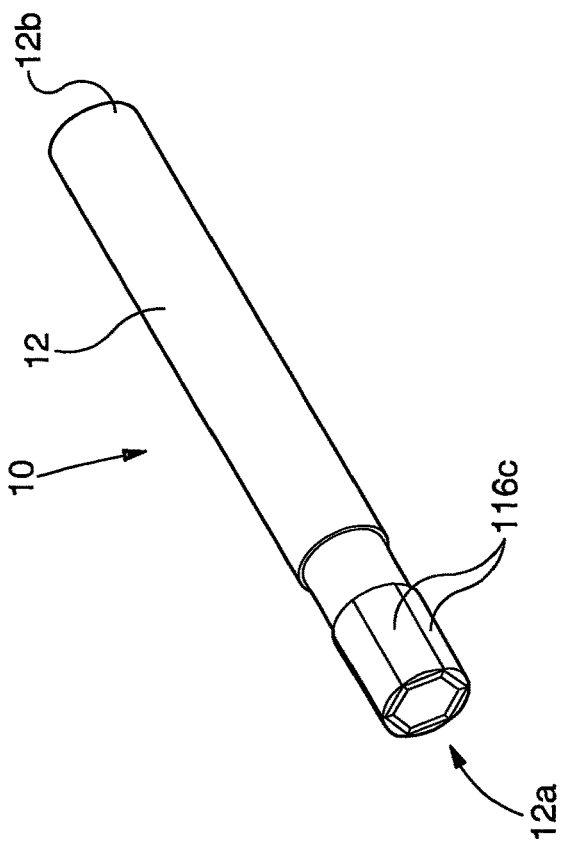

FIGS. 6, 7 and 8 show isometric views of a rotary cutting tool at various stages during formation but offering more detail than FIGS. 1, 2 and 3; and FIGS. 9, 10 and 11 show a rotary cutting tool of a further embodiment, which incorporates a slightly different process, resulting in a different embodiment to that shown in FIGS. 6, 7 and 8.

Referring to FIG. 1, a tooling blank for a rotary cutting tool 10 has a generally cylindrical shank 12. The shank is formed of a high hardness material such as carbide, e.g. tungsten carbide. It will, however, be appreciated that other materials could be used e.g. steel.

A first end 12a of the shank 12 is configured to perform a cutting operation on materials such as fibre reinforced composites (FRCs), although it will be appreciated that the rotary cutting tool 10 can also be used for other applications. A second, opposite end 12b of the shank 12 is configured for engagement in a drive tool, such as a drill or mill, for providing rotary motion about an axis A-A.

Initially, the first end 12a of the shank 12 is machined in order to provide a series of surfaces 14. In the embodiment shown, the first end 12a of the shank 12 is machined to provide six flat surfaces 14, each of which extends longitudinally along the axis A-A. In alternative embodiments, a different number of useful surfaces 14 could instead be formed in the first end 12a of the shank 12, e.g. 2, 3, 4, 5, 7, 8 etc. The number of faces can be chosen depending on the intended application, and to control or constrain the load per surface in order to improve tool life and reduce vibration. It is convenient, for ease of manufacture, for the faces 14 to be flat, although it will be appreciated that other formations, e.g. curved surfaces could also be utilized. Preferably, the surfaces 14 are ground into the carbide, although other methods such as EDM (electric discharge machining) erosion or wire erosion could be employed. A clearance 15 is provided between the machined shank end 12a and the rest of the shank body 12. The size of this clearance can be tailored depending on the application in question, and may not be included in some applications.

Following the formation of the tooling blank shown in FIG. 1, portions (e.g. fillets) of material having a hardness greater than that of the shank 12, e.g. polycrystalline diamond (PCD) 16, are affixed to the flat surfaces 14 of the shank end 12a. In the embodiment shown, one PCD fillet 16 is brazed onto each of the surfaces 14, although it will be appreciated that other fixation methods could also be utilized. In the present embodiment, the surfaces 14 are arranged to be generally parallel to the longitudinal axis. The surfaces need not be exactly parallel to this axis, and may be angled relative to the axis, with a corresponding or nearly corresponding angle to the base of the corresponding PCD fillets 16.

The tool blank 10 shown in FIG. 2 thus provides "diamond surfaces" that surround, or substantially surround, the circumference or perimeter of the shank end 12a. This diamond surface can be further manufactured into a cutting tool by the application of sharp cutting edges on the diamond surface, which may surround the surface.

Providing surfaces of diamond on to a carbide shank is advantageous over using e.g. a tool machined entirely from solid PCD or a single PCD block sintered onto the end 12a of the shank 12, which would both be very expensive. PCD also performs better during cutting operations than entirely solid carbide tooling, as carbide has a lesser hardness and tools manufactured entirely therefrom would be less efficient during cutting and be less hardwearing and have a shorter lifetime. Furthermore, complex geometry that has never before been commercially achievable using solid PCD is a viable solution with embodiments of the present invention.

Figure 4:
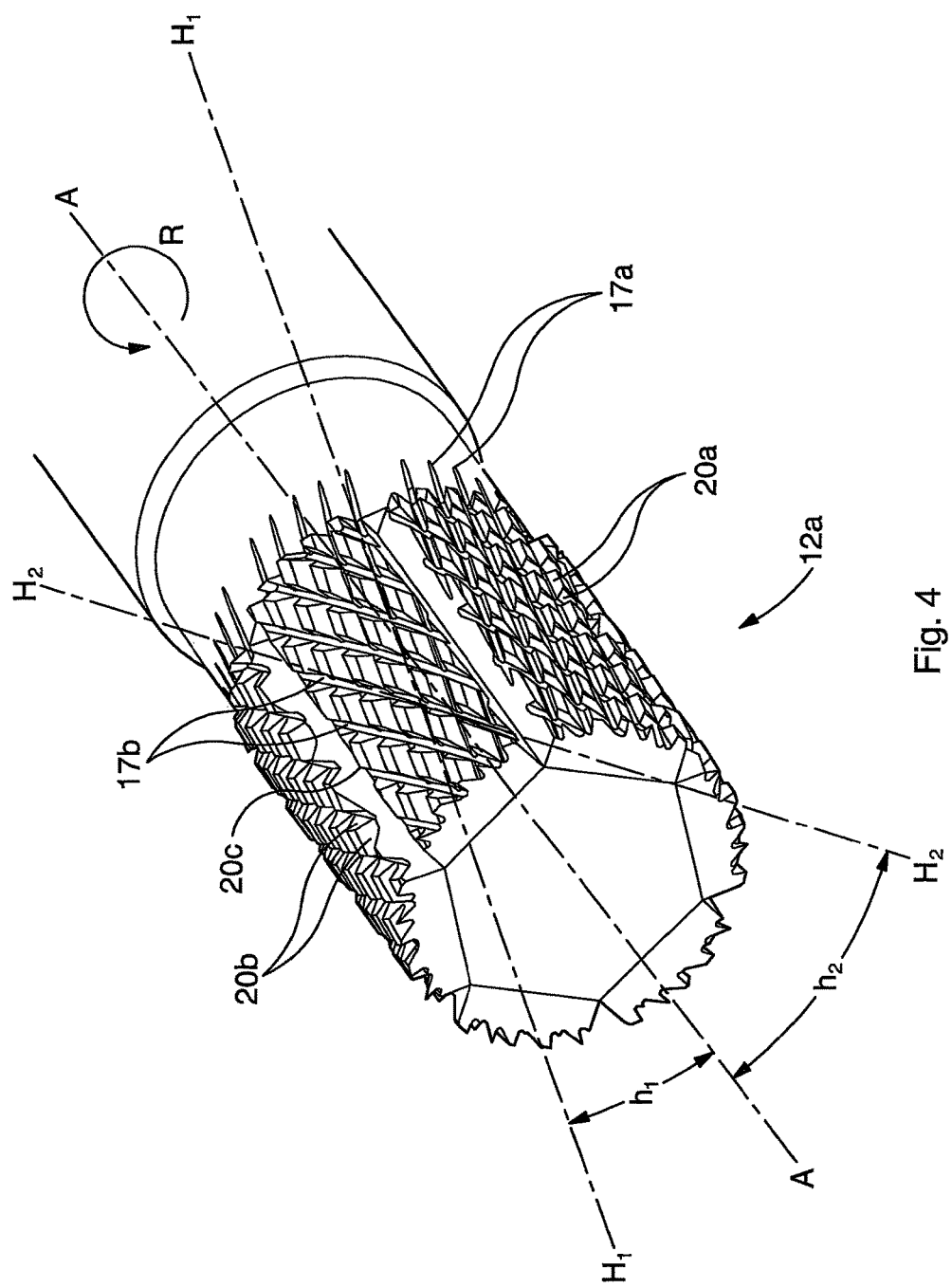
FIG. 4 shows an enlarged view of the end of the tool of FIG. 3.

The diamond surface(s) 16 created as described above is (are) then machined to form the cutting tool shown in FIGS. 3 and 4. The machining can be tailored to provide cutting edges as required for various applications. This advantageously provides a full, or substantially full, range of diamond cutting edges. After the PCD portions 16 are brazed onto the end 12a of the shank 12, flutes 17 are machined therein by a rotary electrode that machines by erosion. If required, the diameter of the composite tool end 12a is machined (roughed) nearly to size prior to the flutes 17 being machined.

In the embodiment shown in FIGS. 3 and 4, two sets of flutes 17 are machined helically into the PCD fillets. A first set of flutes 17a is provided along a first helix (or plurality of helices) $H_1$ and a second set of flutes 17b is provided along a second helix (or plurality of helices) $H_2$. Both helices $H_1$ and $H_2$ are defined with respect to the longitudinal axis A-A of the tool 10. The first helix $H_1$ is a positive helix as defined with respect to the axis A-A. The second helix $H_2$ is a negative helix as defined with respect to the axis A-A. The crossover of the two sets of flutes 17 provides a plurality of teeth 18 formed in the PCD strips 16 and distributed about the circumference or perimeter of the shank 12. That is to say, machining the flutes 17 into the diamond elements 14 creates indentations in the elements 14 and the diamond material left therebetween forms the teeth 18.

In an alternative embodiment (not shown), a single set of flutes 17 may be provided, the flutes 17 again providing the cutting edges. In other alternate embodiments (also not shown), a different number of sets of teeth may be provided along different angles/helices, intersecting or otherwise, to provide cutting edge/teeth as required by various cutting applications.

The flutes 17 are machined into the PCD such that the teeth 18 are angled to be effective in cutting in a predetermined direction. In the example of FIGS. 3 and 4, the tool 10 is intended to rotate in the direction R as indicated by the arrow about axis A-A. The teeth 18 thus comprise two cutting edges 20a, and two edges 20b that are opposite the cutting edges 20a. Due to the angles at which the flutes 17 are machined into the PCD 16, each tooth 18 has a point 20c that will make initial contact with a material to be cut. The two cutting edges 20a will then make contact with the material being cut and the forces will be distributed evenly along the cutting edges 20a. The configuration of the flutes 17 and teeth 18 can be tailored to provide the required cutting and finishing properties as well as to control swarf evacuation.

The tool 10 thus effectively has two sets of teeth 18 (or cutting edges)—one provided along the first helices $H_1$ and another provided along the second helices $H_2$ The angles $h_1$ and $h_2$, defined with respect to the axis A-A and with respect to which the helices $H_1$ and $H_2$ are also defined, are different. In the embodiment shown, $h_2$ is greater than $h_1$. In an alternative embodiment (not shown), the angles $h_1$ and $h_2$ could be equal. The angles can be tailored to the cutting application in question, depending on the required speeds and feeds, customer specification, force distribution etc. The number and size of the flutes 17, as well as the angles at which they are provided, can be chosen to provide a desired number and distribution of teeth 18 and to ensure adequate swarf (debris) evacuation.

Alternatively, pre-formed PCD elements, configured for a specific cutting application, could be attached to the shank 12.

Figure 5:
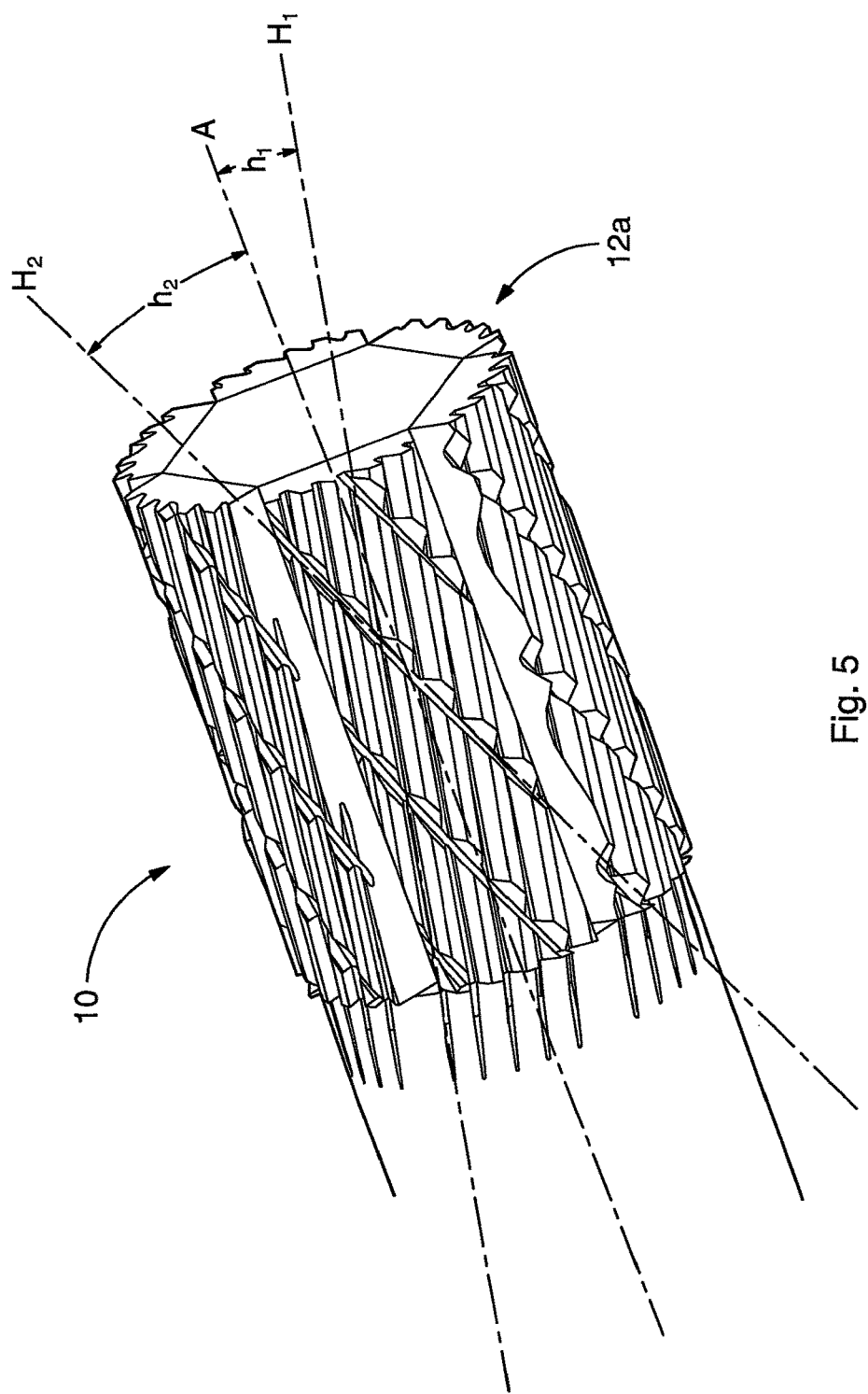
FIG. 5 shows an isometric view of a final version of a rotary cutting tool according to an alternative embodiment.

FIG. 5 shows an alternative embodiment to that of FIG. 4, where the angle $h_1$ is smaller than $h_2$, and fewer, larger teeth 18 are provided.

In use, the second end 12b of the shank 12 is mounted in a machine tool (not shown), which is driven in order to cause the shank 12 to rotate in the direction R. The first end 12a of the shank 12 is presented to a material to be cut and the teeth 18, due to their configuration and arrangement as discussed above, are effective in cutting and finishing (deburring) the material to a high tolerance, and without causing any form of material degradation.

FIGS. 6 to 11 illustrate in more detail the manufacturing process.

Referring to FIG. 6, the PCD fillets 16 are shown attached to the machined flat surfaces 14. The PCD fillets are cut from PCD discs (not shown) whereby the PCD layer 16a is approximately 0.5-2 mm thickness. The thickness is determined by the manufacturing process of the disc and by the cost. This PCD layer 16a is sintered onto a carbide layer 16b as part of the manufacturing process for the PCD disc, prior to being cut and affixed to the surfaces 14. The carbide layer has no thickness constraints. The PCD fillets 16 are removed from the PCD disc by means of EDM machining or other suitable means. The process of creating a bond between the carbide layer 16b and the machined flat surfaces 14 is the preferred method in terms of bond quality and cost. It is possible to attach PCD directly to a material but this requires further equipment and skills.

FIGS. 7 and 8 show the tool blank 10 prior to the formation of any cutting geometry. FIG. 7 illustrates the blank 10 using PCD fillets 16 with square edges, perpendicular to the flat surfaces 14. This causes gaps 21 (or channels) to form in-between the PCD fillets 16. In FIG. 8 the PCD fillets 16 have been radially machined, via grinding or other method, to achieve the final diameter of the rotary cutting tool 16c. In this way the tool can be made to a tolerance specified by design. Also shown in FIG. 8, the fillets have a curved exterior surface along the longitudinal portion. This is often required by the aerospace industry, for example. The PCD layer 16a has been machined, but the carbide layer 16b remains untouched.

FIGS. 9, 10 and 11 show an alternative embodiment, which is similar to that of FIGS. 6, 7 and 8 but illustrate a different design feature that may be incorporated. The shank 10 and surfaces thereon are as described in relation to the first embodiment, above. A similar PCD fillet 116 to that described above can be seen with the POD layer 116a and carbide layer 116b. However the PCD fillet 116 of the present embodiment can be seen with tapered sides. It is possible to manufacture this tip in the same method as previously described with reference to the first embodiment. All of the PCD fillets 116 are attached to the flat surfaces 14 creating a surface of PCD bearing no gaps between the individual fillets 116. FIG. 11 shows the blank once the PCD fillets 116 have been radially machined 116c. Also shown in FIG. 11, the fillets have a curved exterior surface along the longitudinal portion. There is now a full outer surface surrounding the circumference at the end of the tool 12a to which cutting geometry can now be added to create the rotary cutting tool. In other words, while in the first embodiment the sides of the fillets are substantially perpendicular to the surface which attached to the flat surfaces on the shank, in this embodiment, the sides of the fillets are angled to perpendicular by an amount is half of the angle of deviation from a plane in which one flat surface 14 lies to the that of an adjacent flat surface 14 on the shank. In this way, the sides of adjacent flat surfaces 14 join to create an uninterrupted radially outer surface of the PCD, onto which cutting edges can now be formed to create a tool.

The invention claimed is:

1. A blank for forming into a cutting tool, the blank comprising:
    a shank formed of a first material of a first hardness, the shank comprising a plurality of flat surfaces along a longitudinal portion at a first end of said shank; and
    a plurality of flat elements attached to said plurality of flat surfaces of said shank at a first end of said shank, the plurality of flat elements being formed of a second material of a second hardness greater than that of the first hardness, the plurality of flat elements for receiving a plurality of cutting edges thereon to form the cutting tool, the plurality of flat elements forming a continuous region around the shank; and
    wherein the longitudinal portion consists of the plurality of flat surfaces abutting one another around a complete cross sectional circumference of the first end, each of said flat surfaces being tangent to a notional diameter of an inscribed circle of the shank in the longitudinal portion at the first end.

2. The blank of claim 1, wherein the shank is generally cylindrical.

3. The blank of claim 1, wherein said plurality of flat surfaces extend generally longitudinally in line with a longitudinal axis of said shank.

4. The blank of claim 1, wherein the second material of each of the plurality of flat elements is mounted on a substrate of a third material.

5. The blank of claim 1, wherein an attachment surface of the second material in each of the plurality of flat elements is substantially flat.

6. The blank of claim 1, comprising a plurality of teeth that provide said cutting edges.

7. The blank of claim 1, wherein the plurality of flat elements provide cutting edges that surround or substantially surround the first end of said shank.

8. The blank of claim 1, wherein said plurality of flat elements comprise one or more sets of flutes and said plurality of cutting edges are provided by said one or more sets of flutes.

9. The blank of claim 8, wherein said plurality of flat elements have a first set of flutes at a first helical angle with respect to a longitudinal axis of said shank and a second set of flutes at a second helical angle with respect to the longitudinal axis of said shank and said plurality of cutting edges are formed due to the intersection of said first and second sets of flutes.

10. The blank of claim 9, wherein said first set of flutes have a positive helix with respect to the longitudinal axis of said shank and said second set of flutes have a negative helix with respect to the longitudinal axis of said shank.

11. The blank of claim 10, wherein said first set of flutes are provided at a first helical angle and said second set of flutes are provide at a second helical angle not equal to said first helical angle.

12. The blank of claim 1, wherein said first material is carbide and said second material is polycrystalline diamond (PCD).

13. The blank of claim 1 wherein the plurality of flat elements have been radially machined to impart an exterior diameter in the longitudinal portion.

14. The blank of claim 1, wherein the plurality of flat elements form a curved exterior surface along the longitudinal portion.

15. A method of forming a blank for a rotary cutting tool, the method comprising:
providing a shank formed of a first material of a first hardness, the shank comprising a plurality of flat surfaces along a longitudinal portion at a first end of said shank; and
attaching a plurality of flat elements to said plurality of flat surfaces at a first end of said shank, said plurality of flat elements being formed of a second material having a second hardness greater than the first hardness, the plurality of flat elements for receiving a plurality of cutting edges thereon to form the cutting tool, the plurality of flat elements forming a continuous region around the shank and wherein the longitudinal portion consists of the plurality of flat surfaces abutting one another around a complete cross sectional circumference of the first end, each of said flat surfaces being tangent to a notional diameter of an inscribed circle of the shank in the longitudinal portion at the first end.

16. The method of claim 15 further comprising, prior to attaching the plurality of flat elements to the first end of the shank, mounting the second material on a substrate of a third material so as to form the plurality of flat elements.

17. The method of claim 15 further comprising radially machining the plurality of flat elements to form an exterior diameter in the longitudinal portion.

18. the method of claim 17, wherein radially machining the plurality of flat elements comprises grinding.

19. The method of claim 15, wherein the plurality of flat elements form a curved exterior surface in the continuous region along the longitudinal portion.

20. the method of claim 15, wherein the plurality of flat surfaces are formed by at least one of: grinding, wire corrosion, and electric discharge machining (EDM).

21. The method of claim 15, wherein the plurality of flat elements are attached to the shank by way of brazing.

22. The method of claim 15, wherein the second material is polycrystalline diamond (PCD).

23. The method of claim 22, wherein the plurality of flat elements are formed by cutting a PCD disc.

24. The method of claim 23, wherein, prior to cutting the PCD disc, the PCD disc is sintered onto a carbide layer and wherein the carbide layer is attached to the plurality of flat surfaces.

* * * * *